(12) United States Patent
Muraki et al.

(10) Patent No.: US 11,193,874 B2
(45) Date of Patent: Dec. 7, 2021

(54) MICRO-PARTICLE SORTING APPARATUS AND METHOD OF DETERMINING A TRAJECTORY OF AN EJECTED STREAM CARRYING MICRO-PARTICLES

(71) Applicant: Sony Corporation, Tokyo (JP)

(72) Inventors: Yosuke Muraki, Tokyo (JP); Akiko Tsuji, Kanagawa (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 16/517,281

(22) Filed: Jul. 19, 2019

(65) Prior Publication Data

US 2020/0011783 A1 Jan. 9, 2020

Related U.S. Application Data

(63) Continuation of application No. 13/788,165, filed on Mar. 7, 2013, now abandoned.

(30) Foreign Application Priority Data

Mar. 30, 2012 (JP) .................................. 2012-080366

(51) Int. Cl.
*H04N 7/18* (2006.01)
*G01N 15/14* (2006.01)

(52) U.S. Cl.
CPC .......... *G01N 15/14* (2013.01); *G01N 15/1404* (2013.01); *G01N 2015/144* (2013.01)

(58) Field of Classification Search
CPC ........................... G01N 15/14; G01N 15/1404
See application file for complete search history.

(56) References Cited

U.S. PATENT DOCUMENTS

| | | |
|---|---|---|
| 3,710,933 A | 1/1973 | Fulwyler et al. |
| 3,826,364 A | 7/1974 | Bonner et al. |
| 3,924,947 A | 12/1975 | Hogg |

(Continued)

FOREIGN PATENT DOCUMENTS

| | | |
|---|---|---|
| CN | 1950690 A | 4/2007 |
| EP | 1403633 A2 | 3/2004 |

(Continued)

OTHER PUBLICATIONS

Yoon et al. "3D particle position and 3D velocity field measurement in a microvolume via the defocusing concept." Measurement Science and Technology 17.11: 2897 (Year: 2006).*

(Continued)

*Primary Examiner* — Fabio S Lima
(74) *Attorney, Agent, or Firm* — Wolf, Greenfield & Sacks, P.C.

(57) ABSTRACT

A flow cytometer includes apparatus for evaluating a trajectory of an ejected stream that carries micro-particles. The stream may be ejected from a micro-orifice of a microfluidic chip. The apparatus includes an imaging device and at least one processor configured to evaluate a trajectory of the ejected stream in at least two directions, e.g., a focusing direction and a direction transverse to the focusing direction. Based upon a detected trajectory, the system may execute an alarm function if the trajectory indicates an abnormal condition, or may move sample collection containers to accommodate for measured deviations in the trajectory of the ejected stream.

20 Claims, 10 Drawing Sheets

(56) References Cited

U.S. PATENT DOCUMENTS

| | | | |
|---|---|---|---|
| 4,009,435 A * | 2/1977 | Hogg | G01N 15/12 324/71.1 |
| 4,168,460 A | 9/1979 | Menke | |
| 4,173,415 A | 11/1979 | Wyatt | |
| 4,284,496 A | 8/1981 | Newton | |
| 4,318,480 A | 3/1982 | Lombardo et al. | |
| 4,318,481 A | 3/1982 | Lombardo et al. | |
| 4,325,483 A | 4/1982 | Lombardo et al. | |
| 4,538,733 A | 9/1985 | Hoffman | |
| 4,616,234 A | 10/1986 | Wint | |
| 4,987,539 A | 1/1991 | Moore et al. | |
| 5,080,770 A | 1/1992 | Culkin | |
| 5,180,065 A | 1/1993 | Touge et al. | |
| 5,483,469 A | 1/1996 | Van den Engh et al. | |
| 5,602,039 A | 2/1997 | Van den Engh | |
| 5,700,692 A * | 12/1997 | Sweet | G01N 15/1404 209/577 |
| 5,776,781 A | 7/1998 | Vardanega et al. | |
| 6,079,836 A | 6/2000 | Burr et al. | |
| 6,202,734 B1 * | 3/2001 | Sackinger | B22F 3/115 164/271 |
| 6,221,254 B1 | 4/2001 | Dickerson et al. | |
| 6,248,590 B1 | 6/2001 | Malachowski | |
| 6,372,506 B1 | 4/2002 | Norton | |
| 6,410,872 B2 | 6/2002 | Campbell et al. | |
| 6,589,792 B1 * | 7/2003 | Malachowski | G01N 15/1404 209/127.4 |
| 6,813,017 B1 * | 11/2004 | Hoffman | G01N 15/147 356/317 |
| 6,861,265 B1 | 3/2005 | den Engh | |
| 6,941,005 B2 | 9/2005 | Lary et al. | |
| 6,949,715 B2 | 9/2005 | Kelly | |
| 7,019,293 B1 | 3/2006 | Hamada | |
| 7,024,316 B1 | 4/2006 | Ellison et al. | |
| 7,159,752 B2 * | 1/2007 | Farnworth | B23K 3/0623 228/260 |
| 7,417,734 B2 | 8/2008 | Kanda | |
| 7,428,047 B2 | 9/2008 | Oldham et al. | |
| 7,639,358 B2 | 12/2009 | Kanda | |
| 7,691,636 B2 | 4/2010 | Frazier et al. | |
| 7,723,116 B2 | 5/2010 | Evans et al. | |
| 7,758,811 B2 | 7/2010 | Durack et al. | |
| 7,880,108 B2 | 2/2011 | Schembri et al. | |
| 7,901,947 B2 | 3/2011 | Pollack et al. | |
| 8,246,805 B2 | 8/2012 | Shinoda | |
| 8,570,511 B2 | 10/2013 | Wang | |
| 8,681,335 B2 | 3/2014 | Sharpe et al. | |
| 8,691,584 B2 | 4/2014 | Durack et al. | |
| 8,748,183 B2 | 6/2014 | Durack et al. | |
| 8,883,513 B2 | 11/2014 | Pollack et al. | |
| 8,922,636 B1 * | 12/2014 | Belden | G01P 5/001 348/77 |
| 8,922,646 B2 | 12/2014 | Neckels et al. | |
| 9,029,724 B2 | 5/2015 | Hashimoto et al. | |
| 9,087,371 B2 | 7/2015 | Muraki | |
| 9,134,220 B2 | 9/2015 | Malachowski et al. | |
| 9,255,874 B2 | 2/2016 | Sharpe et al. | |
| 9,339,823 B2 | 5/2016 | Muraki et al. | |
| 9,429,276 B2 | 8/2016 | Katsumoto | |
| 9,588,025 B2 | 3/2017 | Fraden et al. | |
| 9,588,036 B2 | 3/2017 | Shinoda | |
| 9,726,527 B2 | 8/2017 | Norton et al. | |
| 9,733,168 B2 | 8/2017 | Miller et al. | |
| RE46,559 E | 9/2017 | Malachowski et al. | |
| 9,784,659 B2 | 10/2017 | Tanase et al. | |
| 9,784,660 B2 | 10/2017 | Otsuka et al. | |
| 9,857,286 B2 | 1/2018 | Muraki et al. | |
| 9,897,530 B2 | 2/2018 | Durack et al. | |
| 9,952,076 B2 | 4/2018 | Norton et al. | |
| 9,958,375 B2 | 5/2018 | Muraki et al. | |
| 10,132,735 B2 | 11/2018 | Muraki | |
| 10,241,025 B2 | 3/2019 | Otsuka et al. | |
| 10,309,891 B2 | 6/2019 | Muraki et al. | |
| 10,309,892 B2 | 6/2019 | Otsuka | |
| 10,386,287 B2 | 8/2019 | Otsuka et al. | |
| 10,466,158 B2 | 11/2019 | Otsuka et al. | |
| 10,605,714 B2 | 3/2020 | Otsuka | |
| 10,876,952 B2 | 12/2020 | Otsuka et al. | |
| 10,876,954 B2 | 12/2020 | Muraki et al. | |
| 2002/0044272 A1 * | 4/2002 | Basiji | G01N 21/6458 356/73 |
| 2002/0171827 A1 * | 11/2002 | van den Engh | G01N 15/1434 356/317 |
| 2003/0222950 A1 | 12/2003 | Jeanmaire | |
| 2004/0058438 A1 | 3/2004 | Fujii et al. | |
| 2004/0062685 A1 | 4/2004 | Norton et al. | |
| 2004/0086159 A1 * | 5/2004 | Lary | G01N 15/1425 382/128 |
| 2004/0169867 A1 * | 9/2004 | Sharpe | G01N 15/14 356/621 |
| 2005/0030534 A1 | 2/2005 | Oldham et al. | |
| 2005/0112541 A1 * | 5/2005 | Durack | G01N 15/1468 435/2 |
| 2006/0125856 A1 | 6/2006 | Kitami et al. | |
| 2006/0177348 A1 | 8/2006 | Yasuda et al. | |
| 2007/0102674 A1 | 5/2007 | Frey et al. | |
| 2007/0195310 A1 | 8/2007 | Kanda | |
| 2007/0257215 A1 | 11/2007 | Rich | |
| 2008/0024619 A1 * | 1/2008 | Ono | H04N 5/232 348/222.1 |
| 2008/0050283 A1 | 2/2008 | Chou et al. | |
| 2008/0053205 A1 | 3/2008 | Pollack et al. | |
| 2008/0067068 A1 * | 3/2008 | Li | B03C 5/005 204/451 |
| 2008/0092655 A1 | 4/2008 | Takiguchi | |
| 2008/0121026 A1 | 5/2008 | Verdegan | |
| 2008/0255705 A1 | 10/2008 | Degeal et al. | |
| 2008/0284827 A1 | 11/2008 | Fagerquist et al. | |
| 2008/0289966 A1 | 11/2008 | Voldman et al. | |
| 2009/0125242 A1 * | 5/2009 | Choi | G01N 21/6458 702/19 |
| 2009/0170186 A1 | 7/2009 | Wu et al. | |
| 2009/0325217 A1 * | 12/2009 | Luscher | G01N 15/1404 435/29 |
| 2010/0009445 A1 | 1/2010 | Patra et al. | |
| 2010/0118300 A1 * | 5/2010 | Wang | G01J 3/0208 356/310 |
| 2010/0297759 A1 | 11/2010 | Kanda | |
| 2010/0315639 A1 | 12/2010 | Muraki | |
| 2010/0322494 A1 * | 12/2010 | Fauver | G01N 15/147 382/131 |
| 2011/0005931 A1 | 1/2011 | Zhe et al. | |
| 2011/0033339 A1 * | 2/2011 | Muraki | B03C 7/12 422/73 |
| 2011/0081684 A1 | 4/2011 | Gauer et al. | |
| 2011/0221892 A1 | 9/2011 | Neckels et al. | |
| 2011/0259749 A1 | 10/2011 | Kanda | |
| 2011/0267457 A1 | 11/2011 | Weitz et al. | |
| 2011/0275052 A1 * | 11/2011 | Schenk | A61D 19/00 435/2 |
| 2011/0284378 A1 | 11/2011 | Shinoda | |
| 2011/0287976 A1 * | 11/2011 | Wang | B01L 3/502753 506/12 |
| 2012/0076349 A1 * | 3/2012 | Manri | G01N 15/1459 382/100 |
| 2012/0084022 A1 | 4/2012 | Giovangrandi et al. | |
| 2012/0135874 A1 * | 5/2012 | Wang | C12Q 1/6844 506/9 |
| 2012/0154804 A1 * | 6/2012 | Tsukii | G01N 15/1434 356/337 |
| 2012/0200857 A1 | 8/2012 | Sharpe et al. | |
| 2012/0202237 A1 | 8/2012 | Sedoglavich et al. | |
| 2012/0247231 A1 | 10/2012 | Kery et al. | |
| 2012/0301869 A1 * | 11/2012 | Evans | G01N 15/1459 435/2 |
| 2012/0314096 A1 | 12/2012 | Kruglick | |
| 2013/0188040 A1 | 7/2013 | Kamen et al. | |
| 2013/0194589 A1 | 8/2013 | Suzuki | |
| 2013/0256136 A1 | 10/2013 | Muraki et al. | |
| 2013/0256197 A1 | 10/2013 | Katsumoto | |
| 2013/0258075 A1 | 10/2013 | Muraki et al. | |
| 2013/0286038 A1 | 10/2013 | Kamath et al. | |

(56) References Cited

U.S. PATENT DOCUMENTS

| | | |
|---|---|---|
| 2014/0021370 A1 | 1/2014 | Suzuki et al. |
| 2014/0043436 A1 | 2/2014 | Bell et al. |
| 2014/0087453 A1 | 3/2014 | Tahara |
| 2014/0097129 A1 | 4/2014 | Foster et al. |
| 2014/0144817 A1 | 5/2014 | Hashimoto et al. |
| 2014/0174206 A1 | 6/2014 | Akiyama et al. |
| 2014/0176704 A1 | 6/2014 | Perrault, Jr. |
| 2014/0193059 A1 | 7/2014 | Muraki |
| 2014/0208875 A1 | 7/2014 | Muraki |
| 2014/0212917 A1 | 7/2014 | Durack et al. |
| 2014/0309782 A1* | 10/2014 | Sharpe ............... G01N 15/1484 700/266 |
| 2014/0346047 A1 | 11/2014 | Shinoda |
| 2014/0354795 A1 | 12/2014 | Tracy et al. |
| 2015/0017678 A1 | 1/2015 | Matula et al. |
| 2015/0057787 A1 | 2/2015 | Muraki et al. |
| 2015/0068957 A1 | 3/2015 | Otsuka et al. |
| 2015/0132766 A1* | 5/2015 | Yasuda ................. C12M 47/04 435/7.1 |
| 2015/0285726 A1 | 10/2015 | Tanase et al. |
| 2015/0285727 A1 | 10/2015 | Muraki |
| 2015/0377763 A1 | 12/2015 | Brun et al. |
| 2016/0148433 A1 | 5/2016 | Petrovskaya et al. |
| 2016/0223451 A1 | 8/2016 | Muraki et al. |
| 2016/0245736 A1 | 8/2016 | Muraki et al. |
| 2016/0266027 A1 | 9/2016 | Muraki et al. |
| 2017/0191925 A1 | 7/2017 | Otsuka et al. |
| 2017/0241889 A1 | 8/2017 | Otsuka et al. |
| 2018/0058999 A1 | 3/2018 | Otsuka et al. |
| 2018/0188150 A1 | 7/2018 | Muraki et al. |
| 2018/0313740 A1 | 11/2018 | Otsuka |
| 2018/0327699 A1 | 11/2018 | Ota et al. |
| 2019/0219494 A1 | 7/2019 | Otsuka et al. |
| 2019/0271633 A1 | 9/2019 | Otsuka et al. |
| 2019/0323945 A1 | 10/2019 | Otsuka et al. |
| 2020/0072726 A1 | 3/2020 | Otsuka |
| 2020/0326271 A1 | 10/2020 | Norton |

FOREIGN PATENT DOCUMENTS

| | | |
|---|---|---|
| EP | 1 757 922 A1 | 2/2007 |
| EP | 1 916 519 A2 | 4/2008 |
| EP | 2 397 836 A1 | 12/2011 |
| EP | 2 400 286 A1 | 12/2011 |
| EP | 2 696 190 A1 | 2/2014 |
| GB | 1 103 190 A | 2/1968 |
| JP | 53-013263 | 2/1978 |
| JP | 56-030870 A | 3/1981 |
| JP | 58-187441 U1 | 12/1983 |
| JP | 62-036542 A | 2/1987 |
| JP | 62-167478 A | 7/1987 |
| JP | 64-012245 A | 1/1989 |
| JP | 09-189653 A | 7/1997 |
| JP | H09-196855 A | 7/1997 |
| JP | 10-507525 A | 7/1998 |
| JP | 11-501258 A | 2/1999 |
| JP | 2002-505423 A | 2/2002 |
| JP | 2002-521658 A | 7/2002 |
| JP | 2004-257756 A | 9/2004 |
| JP | 2005-315799 A | 11/2005 |
| JP | 2006-504970 A | 2/2006 |
| JP | 2006-242849 A | 9/2006 |
| JP | 2006-292769 A | 10/2006 |
| JP | 2007-532874 A | 11/2007 |
| JP | 2008-107110 A | 5/2008 |
| JP | 2009-145213 A | 7/2009 |
| JP | 2009-198511 A | 9/2009 |
| JP | 2009-541093 A | 11/2009 |
| JP | 2009-298012 A | 12/2009 |
| JP | 2010-510782 A | 4/2010 |
| JP | 2010-190680 A | 9/2010 |
| JP | 2010-216992 A | 9/2010 |
| JP | 2010-286292 | 12/2010 |
| JP | 2010-286341 A | 12/2010 |
| JP | 2011-033598 A | 2/2011 |
| JP | 2011-509075 A | 3/2011 |
| JP | 2011-232033 A | 11/2011 |
| JP | 2011-237201 A | 11/2011 |
| JP | 4805417 B1 | 11/2011 |
| JP | 2012-047464 A | 3/2012 |
| JP | 2013-210264 A | 10/2013 |
| JP | 2013-210270 A | 10/2013 |
| JP | 2015-152439 A | 8/2015 |
| WO | WO 1996/012172 A1 | 4/1996 |
| WO | WO 1999/044037 A1 | 9/1999 |
| WO | WO 2000/005566 A1 | 2/2000 |
| WO | WO 2001/002836 A1 | 1/2001 |
| WO | WO 2004/042647 A1 | 5/2004 |
| WO | WO 2010/095391 A1 | 8/2010 |
| WO | WO 2010/129787 A2 | 11/2010 |
| WO | WO 2010/140460 A1 | 12/2010 |
| WO | WO 2013/145905 A1 | 10/2013 |
| WO | WO 2014/115409 A1 | 7/2014 |
| WO | WO 2015/122160 A1 | 8/2015 |

OTHER PUBLICATIONS

International Search Report and Written Opinion dated Jan. 8, 2015 in connection with International Application No. PCT/JP2014/005167.

International Preliminary Report on Patentability dated Apr. 28, 2016 in connection with International Application No. PCT/JP2014/005167.

International Search Report and Written Opinion and English translation thereof dated Nov. 18, 2014 in connection with International Application No. PCT/JP2014/074610.

International Preliminary Report on Patentability and English translation thereof dated Apr. 28, 2016 in connection with International Application No. PCT/JP2014/074610.

International Search Report and English translation thereof dated Sep. 27, 2016 in connection with International Application No. PCT/JP2016/070938.

International Search Report and Written Opinion dated Nov. 6, 2015 in connection with International Application No. PCT/JP2015/004282.

International Preliminary Report on Patentability dated Mar. 16, 2017 in connection with International Application No. PCT/JP2015/004282.

International Search Report and Written Opinion and English translation thereof dated Feb. 24, 2015 in connection with International Application No. PCT/JP2014/080588.

Japanese Office Action and English translation thereof dated Dec. 15, 2015 in connection with Japanese Application No. 2012-080366.

Chinese Office Action and English translation thereof dated Mar. 3, 2016 in connection with Chinese Application No. 2013100954250.

International Search Report and Written Opinion dated Mar. 11, 2014 in connection with International Application No. PCT/JP2013/005910.

International Preliminary Report on Patentability dated May 21, 2015 in connection with International Application No. PCT/JP2013/005910.

Japanese Office Action dated Feb. 23, 2016 in connection with Japanese Application No. 2012-246432 and English translation thereof.

International Search Report and English translation thereof dated Mar. 12, 2013 in connection with Application No. PCT/JP2013/053324.

International Preliminary Report on Patentability and English translation thereof dated Oct. 9, 2014 in connection with Application No. PCT/JP2013/053324.

Extended European Search Report dated Aug. 26, 2014 in connection with Application No. 13768656.4.

International Search Report and Written Opinion and English translation thereof dated Mar. 5, 2013 in connection with Application No. PCT/JP2013/052467.

Japanese Office Action dated Jul. 15, 2014 and English translation thereof in connection with Application No. 2013-547043.

(56) References Cited

OTHER PUBLICATIONS

International Search Report and Written Opinion and English translation thereof dated Mar. 5, 2013 in connection with Application No. PCT/JP2013/051800.
International Search Report and Written Opinion and English translation thereof dated Jan. 21, 2014 in connection with Application No. PCT/JP2013/081152.
International Preliminary Report on Patentability and English translation thereof dated Oct. 9, 2014 in connection with Application No. PCT/JP2013/051800.
Chinese Office Action dated Aug. 25, 2015 in connection with Chinese Application No. 2013800154978 and English translation thereof.
Extended European Search Report dated Sep. 23, 2016 in connection with European Application No. 13872550.2.
International Preliminary Report on Patentability and English translation thereof dated Aug. 6, 2015 in connection with Application No. PCT/JP2013/081152.
International Preliminary Report on Patentability and English translation thereof dated Aug. 25, 2016 in connection with International Application No. PCT/JP2014/080588.
Written Opinion and English translation thereof dated Sep. 27, 2016 in connection with International Application No. PCT/JP2016/070938.
International Preliminary Report on Patentability and English translation thereof dated May 3, 2018 in connection with International Application No. PCT/JP2016/070938.
Japanese Office Action dated Feb. 26, 2019 in connection with Japanese Application No. 2015-137487, and English translation thereof.
European Communication pursuant to Article 94(3) EPC dated Jun. 12, 2019 in connection with European Application No. 13 872 550.2.
Bonner et al., Flourescence Activated Cell Sorting. Review of Scientific Instruments. Mar. 1972;43(3):404-9.
Hartman et al., Jet break-up in electrohydrodynamic atomization in the cone-jet mode. J. Aerosol Sci. vol. 31(1), pp. 65-95; Mar. 1999.
Luo et al., Three-dimensional tracking of fluorescent particles applied to micro-fluidic measurements. 2006. J. Micromech. Microeng. vol. 16; 1689-1699.
Mcintyre et al., Quantitative SLM-based differential interference contrast imaging. Optics Express. Jun. 2010; 18(13):14063-78.
Morton et al., Hydrodynamic metamaterials: Microfabricated arrays to steer, refract, and focus streams of biomaterials. PNAS May 27, 2008. vol. 105(21); 7434-7438.
Murphy et al., Differential Interference Contrast, Olympus Microscopy Resource Center, https://web.archive.org/web/20030312041453/http://www.olympusmicro.com:80/primer/techniques/dic/dichome.html, retrieved from the WayBack Machine on Mar. 30, 2018, noting date of Mar. 12, 2003, 3 pages.
No Author Listed, The EPICS® ALTRA™ Flow Cytometer, Sorting Tutorial, Jul. 1, 2000, Coulter International Corporation, 47 pages.
Orme et al., Electrostatic charging and deflection of nonconventional droplet streams formed from capillary stream breakup. Phys. Fluids. vol. 12(9); Sep. 2000; pp. 2224-2235.
Pereira et al., Defocusing digital particle image velocimetry and the three-dimensional characterization of two-phase flows. 2002. Meas. Sci. Technol. vol. 13; pp. 683-694.
Shapiro, HM, Chapter 6: Flow Sorting, Practical Flow Cytometry, 4th Edition, Dec. 31, 2003, pp. 257-271.
Yoon et al., 3D particle position and 3D velocity field measurement in microvolume via the defocusing concept. Meas. Sci. Technol. 17 (2006) 2897-2905.
Yoshimura et al., The Latest Technology [Modern Technology] of a Cell Sorter, Applied Research Report, Jasco Report. 1990;32(1):1-20.
Japanese Office Action dated Sep. 3, 2019 in connection with Japanese Application No. 2015-137487, and English translation thereof.
Extended European Search Report dated Jun. 26, 2020 in connection with Application No. 20161256.1.

\* cited by examiner

FIG. 7A
FIG. 7B
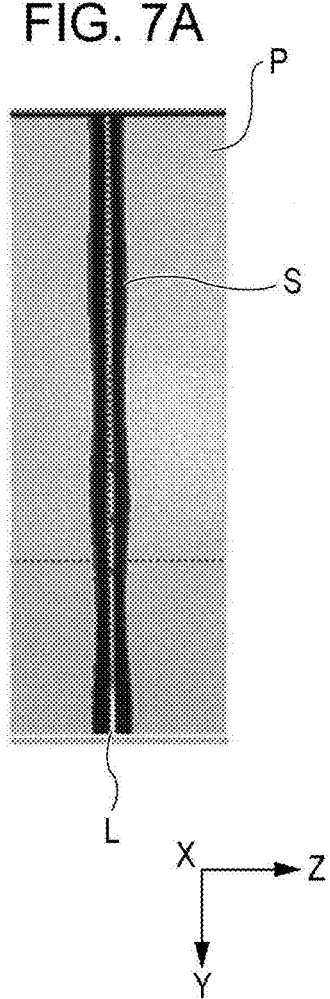
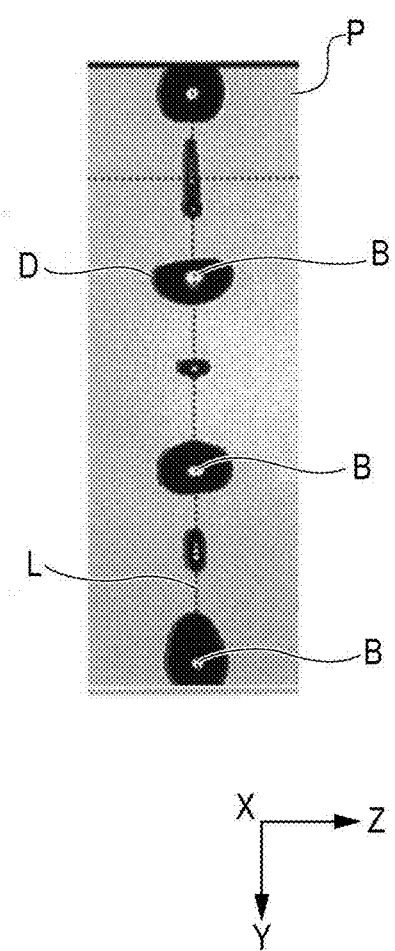

MICRO-PARTICLE SORTING APPARATUS AND METHOD OF DETERMINING A TRAJECTORY OF AN EJECTED STREAM CARRYING MICRO-PARTICLES

CROSS REFERENCE TO RELATED APPLICATIONS

This application is a continuation of and claims the benefit under 35 U.S.C. § 120 of U.S. patent application Ser. No. 13/788,165, titled "MICRO-PARTICLE SORTING APPARATUS AND METHOD OF DETERMINING A TRAJECTORY OF AN EJECTED STREAM CARRYING MICRO-PARTICLES," filed on Mar. 7, 2013, which claims the priority benefit of Japanese Patent Application Number JP2012-080366, filed in the Japanese Patent Office on Mar. 30, 2012. Each of these applications is hereby incorporated by reference in its entirety.

FIELD

The present technology relates to a micro-particle sorting apparatus and a method of determining a trajectory of an ejected stream of the micro-particle sorting apparatus. In particular, the present technology relates to a micro-particle sorting apparatus which automatically determines a trajectory of a fluid stream or the like carrying micro-particles that is ejected from an orifice.

BACKGROUND

There has been a micro-particle sorting apparatus (for example, a flow cytometer) which detects characteristics of micro-particles such as cells optically, electrically or magnetically, and fractionates or sorts the micro-particles so as to collect only micro-particles having predetermined characteristics.

In fractionating the micro-particles with the flow cytometer, first, a fluid stream (laminar flow of sample liquid and sheath liquid containing cells) is generated from an orifice formed in a flow cell, a vibration is applied to the orifice to transform the fluid stream into a form of liquid droplets, and electric charge is applied to the liquid droplets. Then, the movement direction of the liquid droplets containing the micro-particles discharged from the orifice is electrically controlled to collect target micro-particles having the desired characteristics and non-target micro-particles having characteristics other than those desired are sorted into separate collection containers.

For example, in Japanese Unexamined Patent Application Publication No. 2010-190680, which is incorporated herein by reference, describes a microchip flow cytometer according to one embodiment as, "a micro-particle sorting apparatus including: a microchip in which a flow path through which liquid containing micro-particles flows and an orifice through which the liquid flowing through the flow path is discharged into a space outside the chip are disposed; a vibrating element configured to transform the liquid into a form of liquid droplets and discharge the liquid droplets in the orifice; charge means for adding an electric charge to the discharged liquid droplets; optical detection means for detecting the optical characteristics of micro-particles which flow through the flow path; a pair of electrodes provided so as to be opposed to each other with the moving liquid droplets interposed therebetween along a movement direction of the liquid droplets discharged into the space outside the chip; and two or more containers that collect the liquid droplets passing through between the pair of electrodes".

SUMMARY

In a micro-particle sorting apparatus, it is desirable to design fluid collection such that a fluid stream or liquid droplets generated from an orifice formed in a flow cell or a microchip enter inside a collection container. Accordingly, it is necessary to prevent a deviation of the fluid stream or the liquid droplets from an assumed direction. In the related art, the prevention of the deviation has been performed by checking an ejected fluid stream or the like with visual observation of a user, and problems regarding reliability and stability were generated and depended upon the experience level of the user. Further, performing the determination of the deviation with visual observation was extremely complicated in the configuration of the apparatus.

It is desirable to provide a micro-particle sorting apparatus capable of automatically detecting a deviation of a trajectory of an ejected fluid stream or liquid droplets that carries the micro-particles.

In the present technology, the term "micro-particles" broadly includes biologically-relevant micro-particles such as cells, microorganisms, liposomes, and the like, and synthetic particles such as latex particles, gel particles, industrial particles, and the like.

The biologically-relevant micro-particles include chromosomes, liposomes, mitochondria, organelles, and the like configuring various cells. Cells include animal cells (hematopoietic cells and the like) and plant cells. Microorganisms include bacteria such as coli bacteria, viruses such as tobacco mosaic virus, and fungi such as yeast cells. Biologically-relevant micro-particles include nucleic acids, proteins, and biologically-relevant macromolecules such as a complex thereof. Industrial particles may be organic or inorganic high polymer materials, metals and the like, for example. Organic polymer materials include polystyrene, styrene-divinylbenzene, polymethylmethacrylate and the like. Inorganic polymer materials include glasses, silica, magnetic materials, and the like. Metals include gold colloids, aluminum and the like. The shape of the micro-particles is generally spherical, however it may be non-spherical and the size, weight and the like thereof are not particularly limited.

According to the present technology, a micro-particle sorting apparatus which is capable of automatically detecting the deviation of the trajectory of an ejected fluid stream or liquid droplets is provided. According to some embodiments, a flow cytometer comprises a micro-orifice configured to eject a fluidic stream, and an imaging device configured to image an ejected stream, wherein the ejected stream is at least a portion of the fluidic stream ejected from the micro-orifice. The flow cytometer may further include at least one processor that is configured to receive and process an image of the ejected stream imaged by the imaging device, detect one or more contrasted spots located centrally within the ejected stream, and evaluate a trajectory of the ejected stream from the received image. The ejected stream may comprise a continuous liquid stream or comprise a stream of separated liquid droplets. The micro-orifice may be an exit orifice of a micro-fluidic chip.

In some embodiments, the flow cytometer may further comprise electrostatic deflection apparatus configured to deflect the liquid droplets, and charging apparatus configured to apply charge to individual liquid droplets so that individual liquid droplets carrying micro-particles may be sorted according to pre-selected sorting criteria. In some embodiments, the flow cytometer may further comprise automated focusing apparatus, wherein the at least one processor is further configured to measure a first brightness level within at least one central region of the liquid stream or liquid droplets and a second brightness level in at least one remaining portion of the liquid stream or liquid droplets and control the focusing apparatus based upon the measured first and second brightness levels so as to change a focus of the received image. The focus of the received image may be changed according to a contrast ratio computed from the first and second brightness levels.

According to some embodiments, the at least one processor may be configured to evaluate the trajectory of the ejected stream based upon an arrangement of one or more contrasted spots detected within the image of the ejected stream. The at least one processor may be configured to evaluate the trajectory by identifying a line that connects the one or more contrasted spots. In some embodiments, the at least one processor may be configured to compute an angle associated with the trajectory of the ejected stream. The computed angle may be a measure of deviation of the ejected stream from a predetermined direction. According to some embodiments, the at least one processor may be further configured to detect an abnormality in operation of the flow cytometer if the computed angle is greater than a predetermined threshold value. The detected abnormality may be associated with or attributed to a micro-fluidic chip having the micro-orifice. In some embodiments, the at least one processor may be further configured to execute an alerting function if the computed angle is greater than a predetermined threshold value.

In some embodiments, the flow cytometer may further comprise movable sample collection tubes that are configured to be moved in an automated manner responsive to the at least one processor determining that the trajectory of the ejected stream deviates from a predetermined trajectory.

According to some embodiments, the at least one processor may be configured to calculate the trajectory of the ejected stream in a focus direction based upon a first focus condition of a first portion of the ejected stream and a second focus condition of a second portion of the ejected stream. The first focus condition may be evaluated by focusing a first contrasted spot centrally in the ejected stream near a first end of the ejected stream and the second focus condition is evaluated by focusing a second contrasted spot centrally in the ejected stream near a second end of the ejected stream. In some embodiments, the at least one processor may be configured to calculate the trajectory of the ejected stream based upon a difference in positions associated with the first focus condition and second focus condition.

In some embodiments, the at least one processor may be further configured to identify a width of the ejected stream in the received image and determine a diameter of the micro-orifice based upon the identified width of the ejected stream.

The foregoing embodiments and features of a flow cytometer may be implemented in a flow cytometer in any combination.

Embodiments also include a trajectory evaluation system for a flow cytometer. The trajectory evaluation system may comprise an imaging device configured to image the ejected stream, wherein the ejected stream is at least at portion of a fluidic stream ejected from a micro-orifice of the flow cytometer. The trajectory evaluation system may further comprise at least one processor configured to receive and process an image of the ejected stream imaged by the imaging device, detect one or more contrasted spots located centrally within the ejected stream, and evaluate a trajectory of the ejected stream from the received image. The ejected stream may comprise a continuous liquid stream or comprise a stream of separated liquid droplets. The micro-orifice may be an exit orifice of a micro-fluidic chip.

According to some embodiments, the trajectory evaluation system may include automated focusing apparatus, wherein the at least one processor is further configured to measure a first brightness level within at least one central region of the liquid stream or liquid droplets and a second brightness level in at least one remaining portion of the liquid stream or liquid droplets and control the focusing apparatus based upon the measured first and second brightness levels so as to change a focus of the received image. The focus of the received image may be changed according to a contrast ratio computed from the first and second brightness levels.

According to some embodiments, the at least one processor may be configured to evaluate the trajectory of the ejected stream based upon an arrangement of one or more contrasted spots detected within the image of the ejected stream. The at least one processor may be configured to evaluate the trajectory by identifying a line that connects the one or more contrasted spots. In some embodiments, the at least one processor may be configured to compute an angle associated with the trajectory of the ejected stream. The computed angle may be a measure of deviation of the ejected stream from a predetermined direction. According to some embodiments, the at least one processor may be further configured to detect an abnormality in operation of a flow cytometer if the computed angle is greater than a predetermined threshold value. The detected abnormality may be associated with or attributed to a micro-fluidic chip having the micro-orifice. In some embodiments, the at least one processor may be further configured to execute an alerting function if the computed angle is greater than a predetermined threshold value.

In some embodiments, the trajectory evaluation system may provide a signal for moving movable sample collection tubes that are configured to be moved in an automated manner responsive to the at least one processor determining that the trajectory of the ejected stream deviates from a predetermined trajectory.

According to some embodiments, the at least one processor may be configured to calculate the trajectory of the ejected stream in a focus direction based upon a first focus condition of a first portion of the ejected stream and a second focus condition of a second portion of the ejected stream. The first focus condition may be evaluated by focusing a first contrasted spot centrally in the ejected stream near a first end of the ejected stream and the second focus condition is evaluated by focusing a second contrasted spot centrally in the ejected stream near a second end of the ejected stream. In some embodiments, the at least one processor may be configured to calculate the trajectory of the ejected stream based upon a difference in positions associated with the first focus condition and second focus condition.

In some embodiments, the at least one processor may be further configured to identify a width of the ejected stream in the received image and determine a diameter of the micro-orifice based upon the identified width of the ejected stream.

The foregoing embodiments and features of a trajectory evaluation system may be implemented in a trajectory evaluation system for a flow cytometer in any combination.

Embodiments also include a method of measuring a trajectory of an ejected stream in a flow cytometer. The method may comprise an act of imaging, with an imaging device, the ejected stream, wherein the ejected stream is at least a portion of a fluidic stream ejected from a micro-orifice of the flow cytometer. The method may further include receiving, by at least one processor, an image of the ejected stream imaged by the imaging device, and processing, by the at least one processor, the received image to detect one or more contrasted spots located centrally within the ejected stream and to evaluate a trajectory of the ejected stream. The ejected stream may comprise a continuous liquid stream or comprise a stream of separated liquid droplets. The micro-orifice may be an exit orifice of a micro-fluidic chip.

According to some embodiments, the method of measuring a trajectory may include an act of automated focusing, wherein the at least one processor measures a first brightness level within at least one central region of the liquid stream or liquid droplets and a second brightness level in at least one remaining portion of the liquid stream or liquid droplets and controls focusing apparatus based upon the measured first and second brightness levels so as to change a focus of the received image. The focus of the received image may be changed according to a contrast ratio computed from the first and second brightness levels.

According to some embodiments, the method of measuring a trajectory may comprise evaluating the trajectory of the ejected stream, by the at least one processor, based upon an arrangement of one or more contrasted spots detected within the image of the ejected stream. The at least one processor may evaluate the trajectory by identifying a line that connects the one or more contrasted spots. In some embodiments, the at least one processor may compute an angle associated with the trajectory of the ejected stream. The computed angle may be a measure of deviation of the ejected stream from a predetermined direction. According to some embodiments, the at least one processor may detect an abnormality in operation of a flow cytometer if the computed angle is greater than a predetermined threshold value. The detected abnormality may be associated with or attributed to a micro-fluidic chip having the micro-orifice. In some embodiments, the at least one processor may execute an alerting function if the computed angle is greater than a predetermined threshold value.

In some embodiments, the method of measuring a trajectory may include providing a signal, by the at least one processor, for moving movable sample collection tubes that are configured to be moved in an automated manner responsive to the at least one processor determining that the trajectory of the ejected stream deviates from a predetermined trajectory.

According to some embodiments, the method of measuring a trajectory may include calculating the trajectory of the ejected stream in a focus direction, by the at least one processor, based upon a first focus condition of a first portion of the ejected stream and a second focus condition of a second portion of the ejected stream. The first focus condition may be evaluated by focusing a first contrasted spot centrally in the ejected stream near a first end of the ejected stream and the second focus condition is evaluated by focusing a second contrasted spot centrally in the ejected stream near a second end of the ejected stream. In some embodiments, the at least one processor may calculate the trajectory of the ejected stream based upon a difference in positions associated with the first focus condition and second focus condition.

In some embodiments, the method of measuring a trajectory may further comprise identifying, by the at least one processor, a width of the ejected stream in the received image and determining a diameter of the micro-orifice based upon the identified width of the ejected stream.

The foregoing embodiments and features of a method of measuring a trajectory of an ejected stream in a flow cytometer may be implemented in flow cytometer in any combination.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIGS. 7A and 7B are pictures showing an example of images of a fluid stream and liquid droplets imaged by a droplet camera of a flow cytometer.

The features and advantages of the present embodiments will become more apparent from the detailed description set forth below when taken in conjunction with the drawings.

DETAILED DESCRIPTION

Hereinafter, an embodiment according to the present technology will be described with reference to the drawings. The embodiment, which will be described hereinafter, is an example of the representative embodiments of the present technology, and the scope of the present technology is not narrowed by the embodiment. The description will be in the following order.

1. Apparatus Configuration of Micro-particle Sorting Apparatus according to Embodiment of Present Technology
    1-1. Chip Loading Module
    1-2. Microchip
    1-3. Deflection Plate
    1-4. Collection Unit
    1-5. Droplet Camera
    1-6. Control Unit and the like
2. Method of Determining a Stream Trajectory of Micro-particle Sorting Apparatus according to Another Embodiment of Present Technology
    2-1. Fluid Stream Generating Step $S_1$
    2-2. Droplet Camera Z Axis Scanning and Fluid Stream Imaging Step $S_2$
    2-3. Focusing Step $S_3$
    2-4. Center Line Detecting Step $S_4$
    2-5. Displaying Step $S_5$
    2-6. Orbital Direction Determining Step $S_6$
    2-6-1. Z Axis Direction Determining Step $S_{61}$
    2-6-2. X Axis Direction Determining Step $S_{62}$
    2-7. Alerting Step $S_7$
    2-8. Collection Tube Moving and Aligning Step $S_8$
3. Various Additional Embodiments

Figure 1:
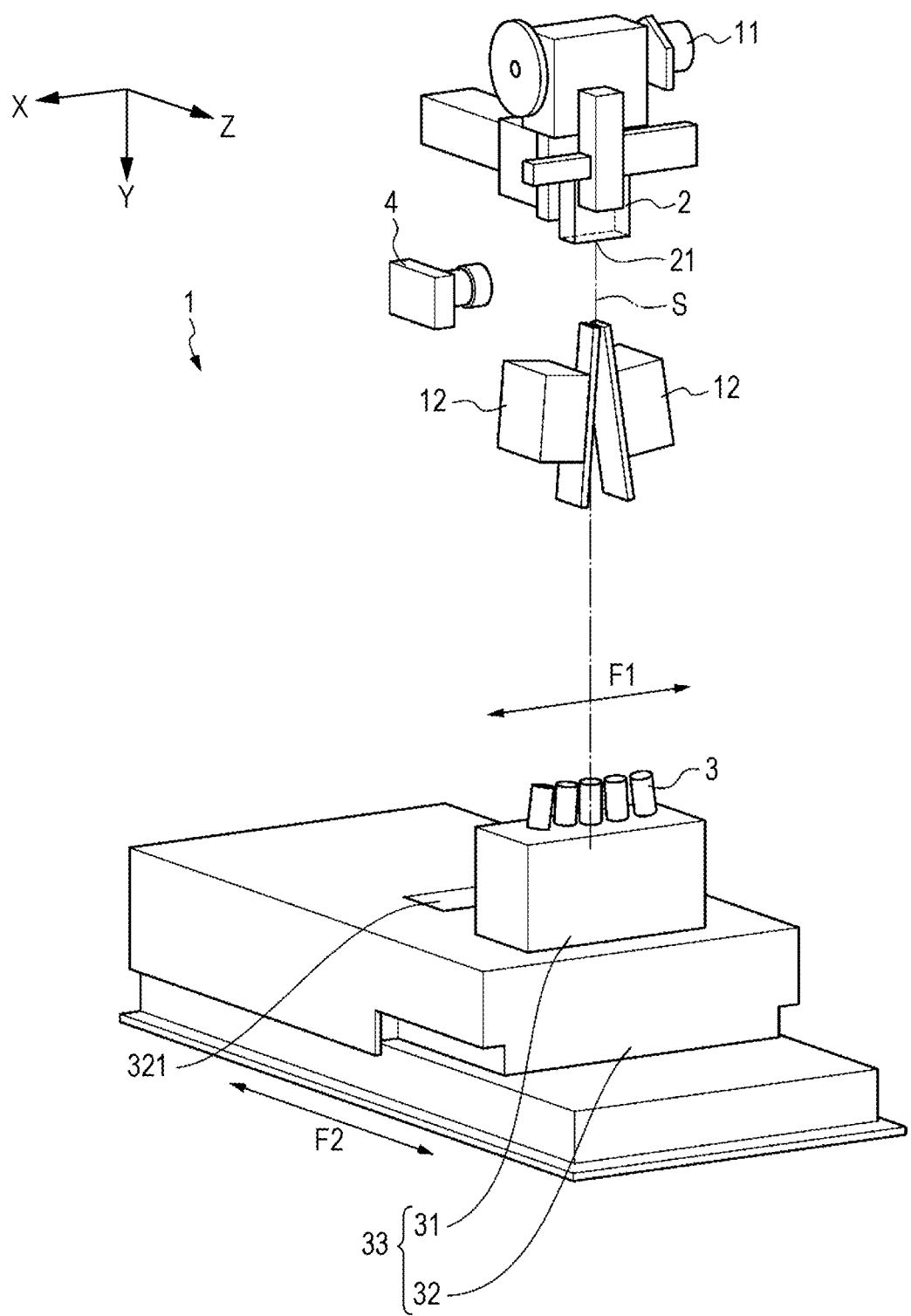
FIG. 1 is a schematic diagram illustrating a configuration of a sorting system of a micro-particle sorting apparatus (flow cytometer) according to an embodiment of the present technology. The flow cytometer may be configured as a microchip flow cytometer.

1. Apparatus Configuration of Micro-Particle Sorting Apparatus According to Embodiment of Present Technology FIG. 1 is a schematic diagram illustrating a configuration of a sorting system of a micro-particle sorting apparatus 1 (hereinafter, also referred to as a "flow cytometer 1") according to an embodiment of the present technology. According to one embodiment, the flow cytometer is configured as a microchip flow cytometer.

1-1. Chip Loading Module

Reference numeral 11 in the drawing denotes a chip loading module storing a microchip 2. The chip loading module 11 includes a chip loading unit which performs transportation to store the microchip 2 inserted from the outside to a predetermined position, and a transporting liquid connecting unit which supplies sample liquid, sheath liquid, and the like including micro-particles to the stored microchip 2 (both not shown). In addition, the chip loading module 11 includes a chip vibrating unit which is formed in the microchip 2, and applies a vibration to the orifice 21 generating laminar flow (flow stream S) of sample liquid and sheath liquid to transform the fluid stream S into a form of liquid droplets and discharge the liquid droplets, and an electric charge unit which applies an electric charge to the discharged liquid droplets (both not shown).

1-2. Microchip

Figure 2A:
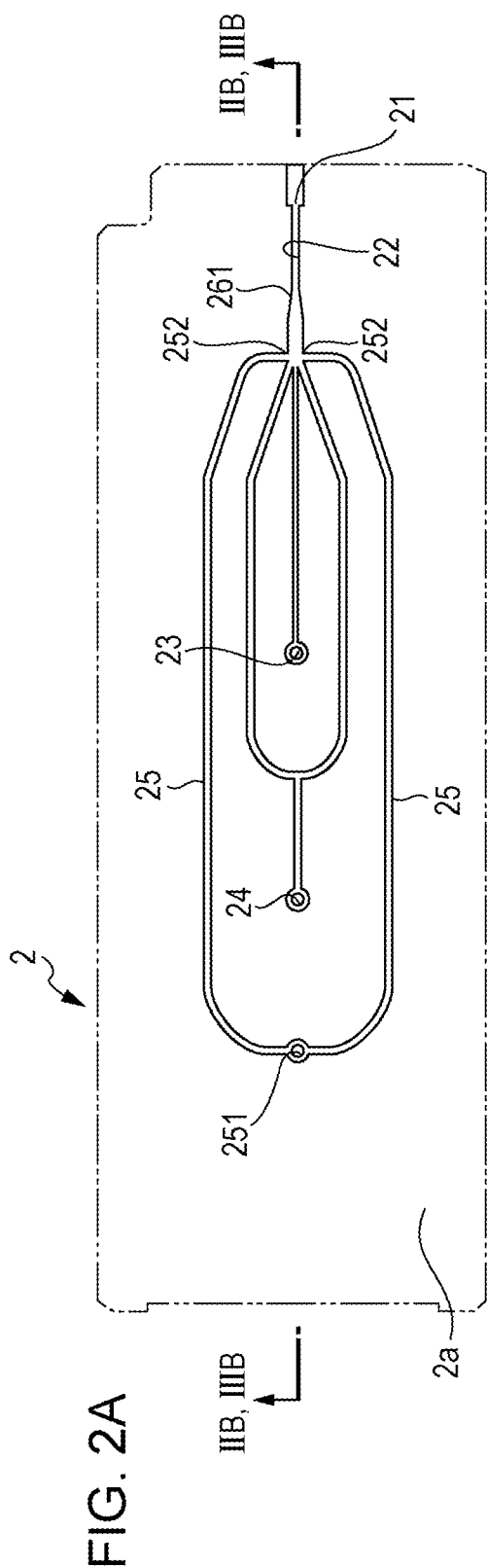
FIGS. 2A and 2B are schematic diagrams illustrating a configuration of an example of a microchip which is mountable on a flow cytometer.
Figure 2B:
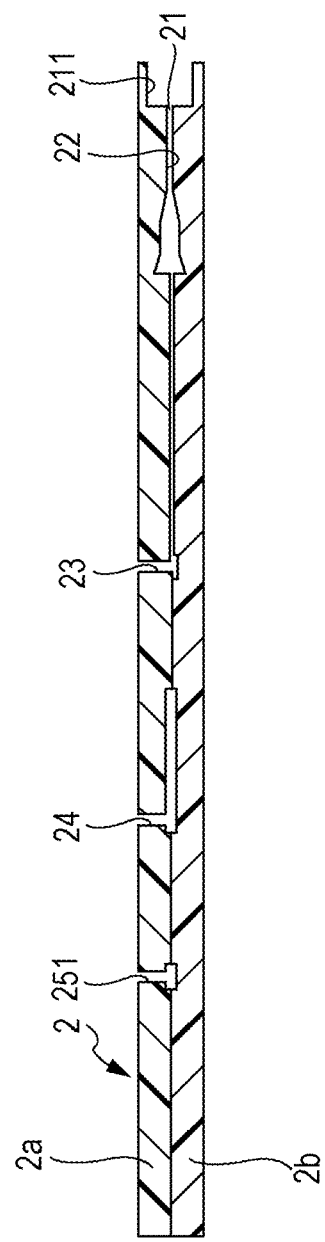
Figure 3C:
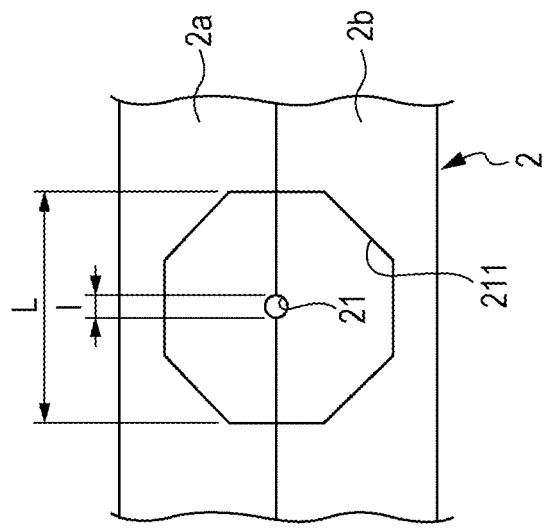
FIGS. 3A to 3C are schematic diagrams illustrating a configuration of an orifice of a microchip.
Figure 3A:
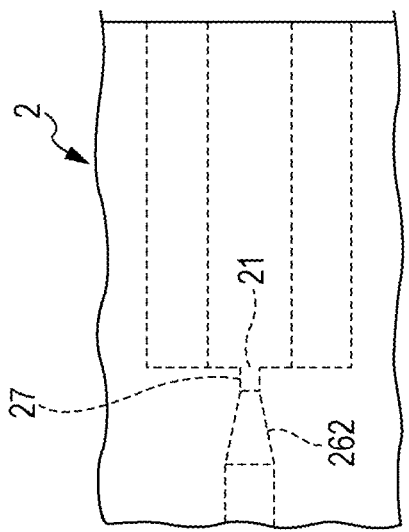
Figure 3B:
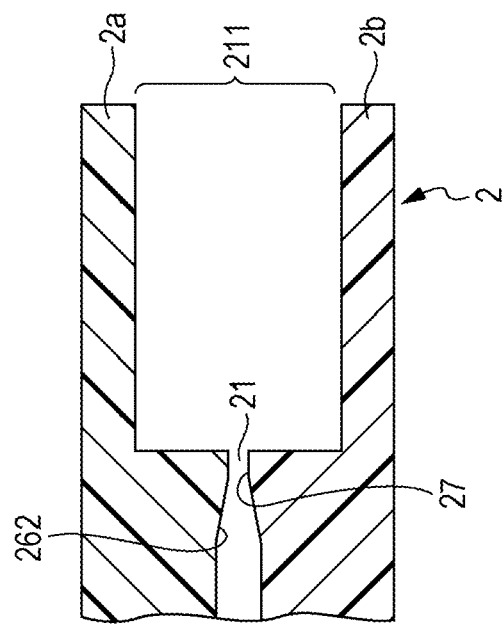

FIGS. 2A to 3C show an example of the microchip 2 which is mountable on the flow cytometer 1. FIG. 2A shows a schematic diagram of the upper surface and FIG. 2B shows a cross-sectional schematic diagram taken along the line IIB-IIB of FIG. 2A. FIGS. 3A to 3C are diagrams schematically illustrating one configuration of the orifice 21 of the microchip 2. FIG. 3A shows a schematic diagram of the upper surface, FIG. 3B shows a cross-sectional schematic diagram, and FIG. 3C shows a plan diagram. FIG. 3B is a cross-sectional diagram taken along the line IIIB-IIIB of FIG. 2A.

The microchip 2 may be formed by bonding substrate layers 2a and 2b on which a sample flow path 22 is formed. The sample flow path 22 on the substrate layers 2a and 2b can be formed by injection molding of thermoplastic resin using mold. For the thermoplastic resin, existing plastics of the related art as materials of the microchip such as polycarbonate, polymethylmethacrylate resin (PMMA), cyclic polyolefins, polyethylene, polystyrene, polypropylene, polydimethylsiloxane (PDMS) or the like may be used.

The sample liquid is introduced to a sample inlet 23 from the transporting liquid connecting unit and joins with the sheath liquid which is introduced to a sheath inlet 24 from the transporting liquid connecting unit to transport the liquid to the sample flow path 22. The sheath liquid introduced from the sheath inlet 24 is transported by dividing into two directions. Then, in the joining portion with the sample liquid introduced from the sample inlet 23, the sheath liquid joins with the sample liquid so as to interpose the sample liquid from two directions. Accordingly, in the joining portion, three-dimensional laminar flow is formed in which the laminar flow of the sample liquid is positioned at the center of the laminar flow of the sheath liquid.

Reference numeral 25 denotes a suction flow path for removing clogging and bubbles by causing a negative pressure inside the sample flow path 22 to counterflow temporarily, when clogging and bubbles are generated in the sample flow path 22. At the one end of the suction flow path 25, a suction outlet 251 which is connected to a negative pressure source such as a vacuum pump or the like through the transporting liquid connecting unit is formed, and another end thereof is connected to the sample flow path 22 in a communicating port 252.

The laminar flow width of the three-dimensional laminar flow may be formed to be narrowed down in narrowing units 261 (see FIGS. 2A and 2B) and 262 (see FIGS. 3A to 3C) so that the area of the perpendicular cross section with respect to the transporting liquid direction becomes small gradually or in steps from the upstream to the downstream in the transporting liquid direction. After that, the three-dimensional laminar flow becomes the fluid stream S (see FIG. 1) and is discharged from the orifice 21 provided at one end of the flow path. In FIG. 1, the discharging direction of the fluid stream S from the orifice 21 is shown as the positive Y axis direction.

The characteristics of the micro-particles may be detected between the narrowing unit 261 and the narrowing unit 262 of the sample flow path 22. For example, in optical detection by a light irradiation detecting unit (now shown), a laser is emitted with respect to the micro-particles which are arranged in a line in the center of the three-dimensional laminar flow to flow inside the sample flow path 22, and scattering light and fluorescence generated from the micro-particles are detected by one or more light detectors.

A connecting unit of the sample flow path 22 and the orifice 21 is set as a straight unit 27 formed to be linear. The straight unit 27 functions for ejecting the fluid stream S from the orifice 21 linearly in the positive Y axis direction.

The fluid stream S ejected from the orifice 21 may be transformed into a form of liquid droplets by the vibration applied to the orifice 21 by a chip vibrating unit. The orifice 21 is opened in the end surface direction of the substrate layers 2a and 2b, and a cut-out portion 211 is provided between the opening position and the end surface of the substrate layers. The cut-out portion 211 is formed by cutting out the substrate layers 2a and 2b between the opening position of the orifice 21 and the end surface of the substrates so that a diameter L of the cut-out portion 221 is larger than a diameter 1 of the opening of the orifice 21 (see FIG. 3C). It is desirable that the diameter L of the cut-out portion 211 be formed to be larger by more than double the diameter 1 of the opening of the orifice 21 so as not to interrupt the movement of the liquid droplets discharged from the orifice 21.

1-3. Deflection Plates

Reference numerals 12 and 12 in FIG. 1 denote a pair of deflection plates which are arranged to oppose each other by interposing the fluid stream S (or the discharged liquid droplets) which is ejected from the orifice 21 and imaged by a droplet camera 4 which will be described later. The deflection plates 12 and 12 include electrodes which control the movement direction of the liquid droplets discharged from the orifice 21 by an electric force interacting with electric charge applied to the liquid droplets. In addition, the deflection plates 12 and 12 also control the trajectory of the fluid stream S generated from the orifice 21 by an electric force interacting with electric charge applied to the fluid stream S. In FIG. 1, the opposing direction of the deflection plates 12 and 12 is shown as the X axis direction.

1-4. Collection Unit

In the flow cytometer 1, the fluid stream S (or liquid droplets D thereof) may be collected in any of a plurality of collection tubes (collection containers) 3 which are arranged in a line in the opposing direction (X axis direction) of the deflection plates 12 and 12 (see FIG. 1). The collection tubes 3 may be general-purpose plastic tubes or experimental glass tubes. The number of the collection tubes 3 is not particularly limited, but the embodiment shows a case of arranging five collection tubes. The fluid stream S generated from the orifice 21 is introduced to any one of the five collection tubes 3 depending on the existence or non-existence, or the size of the electric force acting between the deflection plates 12 and 12 and collected therein.

The collection tubes 3 may be disposed in a collection tube container 31 in an exchangeable manner. The collection tubes 3 are disposed in the movement direction (X axis direction) shown as an arrow F1 in FIG. 1 in a movable manner. For example, the collection tubes 3 may be disposed so that only the collection tubes 3 move in the X axis direction in a state where the collection tube container 31 is fixed, or the collection tubes 3 may be disposed movably with the movement of the collection tube container 31.

The collection tube container 31 may be disposed on a Z axis stage 32 which is configured to be movable in a direction (Z axis direction) perpendicular to the discharging direction (Y axis direction) of the fluid stream S from the orifice 21 and the opposing direction (X axis direction) of the deflection plates 12 and 12. An arrow F2 in FIG. 1 denotes the movement direction of the Z axis stage 32. Reference numeral 321 in the drawing denotes a waste liquid port provided on the Z axis stage 32. In the flow cytometer 1, the collection tube container 31 and the Z axis stage 32 configure a collection unit 33 which is driven by a Z axis motor (not shown).

1-5. Droplet Camera

A droplet camera 4 may be any suitable camera (CCD camera, CMOS image sensor or the like) for imaging the fluid stream S ejected from the orifice 21 of the microchip 2 or the liquid droplets discharged therefrom (see FIG. 1). The droplet camera 4 may be designed to be able to perform automated focusing under the control of at least one processor on the captured image of the fluid stream S or the liquid droplets. The image captured by the droplet camera 4 may be displayed on the display unit such as a display, and used for a user to check for the formation state (size, shape, intervals and the like of the liquid droplets) of the liquid droplets of the orifice 21.

In the flow cytometer 1, the trajectories of the fluid stream S (or liquid droplets) ejected from the orifice 21 are different depending on the individual differences of the mounted microchips 2, and the position of the fluid stream S can be changed in the Z axis direction (and X axis direction) in the drawing, at each time of exchanging the microchip 2. Continuing ejecting the fluid stream S or continuing discharging the liquid droplets may result in the degradation or the like of the microchip 2, so that the position of the fluid stream S (or the liquid droplets) can be changed over time in the Z axis direction (and X axis direction) in the drawing. The droplet camera 4 also functions for detecting such position change of the fluid stream S (or the liquid droplets) in the Z axis direction (and X axis direction).

1-6. Control Unit and the Like

In addition to the above described configuration, the flow cytometer 1 includes a light irradiation detecting unit for detecting the optical characteristics of micro-particles, a data analysis unit for determining the characteristics, a tank unit which stores the sample liquid and the sheath liquid, and a control unit for controlling each configuration thereof, which are included in general flow cytometers.

The control unit may be configured by a general-purpose computer including at least one CPU, a memory or a hard disk and the like, and an OS. Machine-readable instructions that may be executed by the at least one CPU may be stored in memory and, when executed by the at least one CPU, specially adapt the computer for executing each step of the position control, which will be described later, and other processes of the flow cytometer.

The light irradiation detecting unit may be configured by a laser light source, an irradiation system which includes a condensing lens, a dichroic mirror, a bandpass filter and the like which condense and emit the laser with respect to the micro-particles, and a detecting system which detects the measuring target light generated from the micro-particles by excitation of the laser. The detecting system may be configured by an area imaging device or the like such as a PMT (photomultiplier tube), a CCD, or a CMOS element.

The measuring target light which is detected by the detecting system of the light irradiation detecting unit is the light which is generated from the micro-particles by the emission of the measuring light, and can be scattered light such as forward-scattered light, backward-scattered light, Rayleigh-scattered or Mie scattered light, or fluorescence. The above measuring target light is converted into electrical signals, output to the control unit and provided for determining the optical characteristics of the micro-particles.

The flow cytometer 1 may magnetically or electrically detect the characteristics of the micro-particles. In this case, microelectrodes are arranged to oppose each other in the sample flow path 22 of the microchip 2, and a resistance value, a capacitance value, an inductance value, impedance, a changing value of the electric field between the electrodes, or the change in magnetization, magnetic field, and the like are measured.

Figure 4:
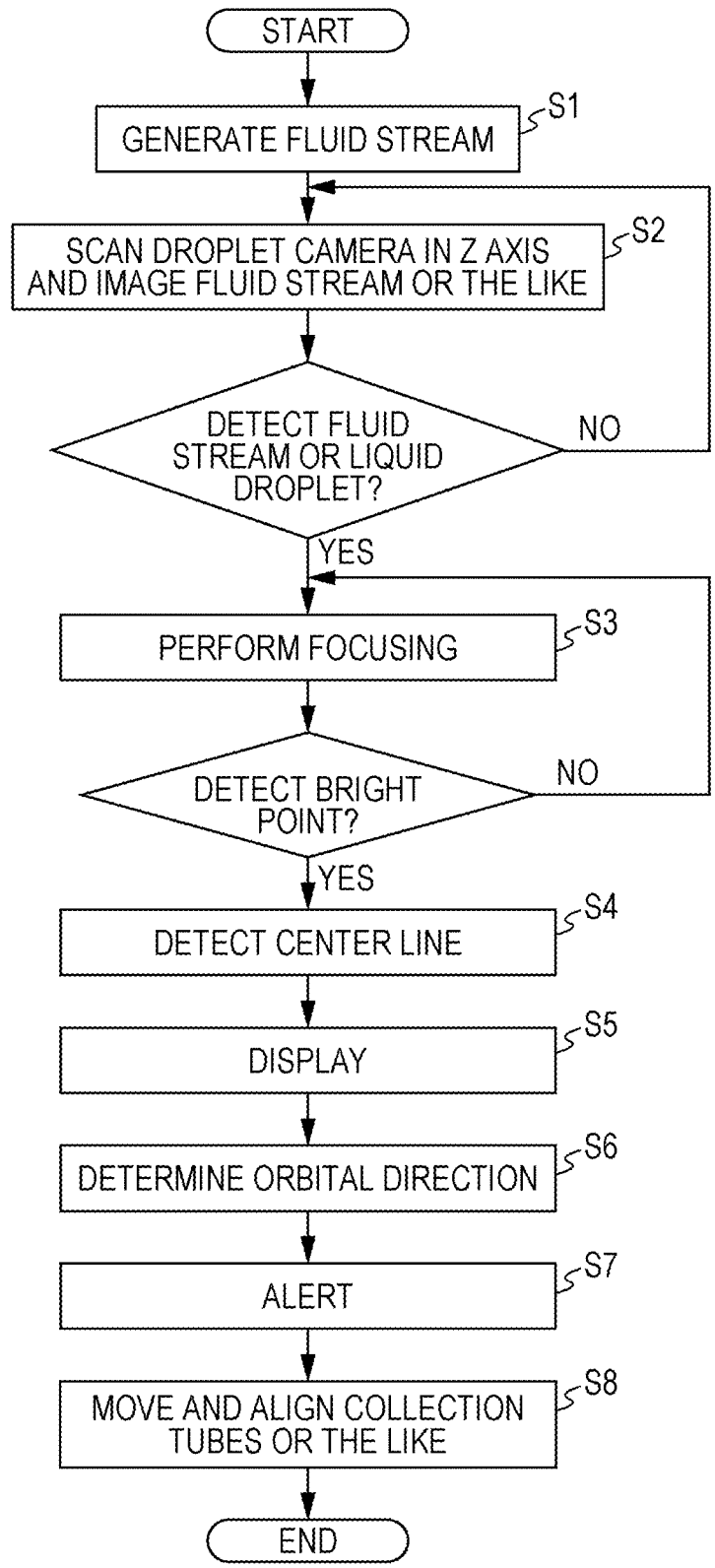
FIG. 4 is a flowchart illustrating steps for determining a trajectory of a fluid stream or the like of a flow cytometer.

2. Method of Determining a Stream Trajectory of Micro-Particle Sorting Apparatus According to Another Embodiment of Present Technology 2-1. Fluid Stream Generating Step $S_1$ FIG. 4 is a flowchart illustrating steps for determining the trajectory of the fluid stream S (or the liquid droplets) of the flow cytometer 1, according to one embodiment. The steps for determining the trajectory include processes of a "fluid stream generating step $S_1$," a "droplet camera Z axis scanning and fluid stream imaging step $S_2$," a "focusing step $S_3$," a "center line detecting step $S_4$," a "displaying step $S_5$," an "orbital direction determining step $S_6$," an "alerting step $S_7$," and a "collection tube moving and aligning step $S_8$." Hereinafter, each process will be described.

First, in the fluid stream generating step $S_1$, the transporting liquid connecting unit starts transporting the sample liquid and the sheath liquid to the sample inlet 23 and the sheath inlet 24 of the microchip 2, and a fluid stream S is ejected from the orifice 21 (see FIG. 4). The control unit outputs the signals to the transporting liquid connecting unit and starts transporting the sample liquid and the sheath liquid. The fluid stream S ejected from the orifice 21 may be collected in the waste liquid port 321 and disposed of.

In this step $S_1$, the chip vibrating unit applies the vibration to the orifice 21, and the liquid droplets may be discharged instead of a continuous fluid stream S from the orifice, so that the liquid droplets can be collected in the waste liquid port 321 and disposed of.

2-2. Droplet Camera Z Axis Scanning and Fluid Stream Imaging Step $S_2$

In the step $S_2$, the control unit outputs the signals to the droplet camera 4 and the droplet camera 4 which receives the signals may be moved in the Z axis direction (see FIG. 4), for example, to center an image of the stream. Then, the control unit outputs the signals to the droplet camera 4, and the droplet camera 4 which receives the signals performs imaging of the fluid stream S (or the liquid droplets).

2-3. Focusing Step $S_3$

In the step $S_3$, in a case where the image of the fluid stream S (or the liquid droplets) is detected, by the control unit, the focusing may be performed in the X axis direction when imaging the image of the fluid stream S (or the liquid droplets) by the droplet camera 4 (see FIG. 4). The image of the fluid stream S (or the liquid droplets) imaged by the droplet camera 4 may be output to the control unit, and the control unit may perform focusing control until detecting the contrasted or bright points in the image in the focusing step $S_3$. Herein, the bright points denote one or a plurality of pixels having higher brightness than a predetermined threshold value in the image of the fluid stream S (or the liquid droplets) imaged by the droplet camera 4. A contrasted point or spot may be a spot having a luminance or color significantly different (e.g., greater than about 10% variation) from a background luminance or color around the spot. For example, a contrasted spot may be a gray spot on a white background, a yellow spot on a red background, a white spot on a black background, etc. in a recorded image.

Figure 5A:
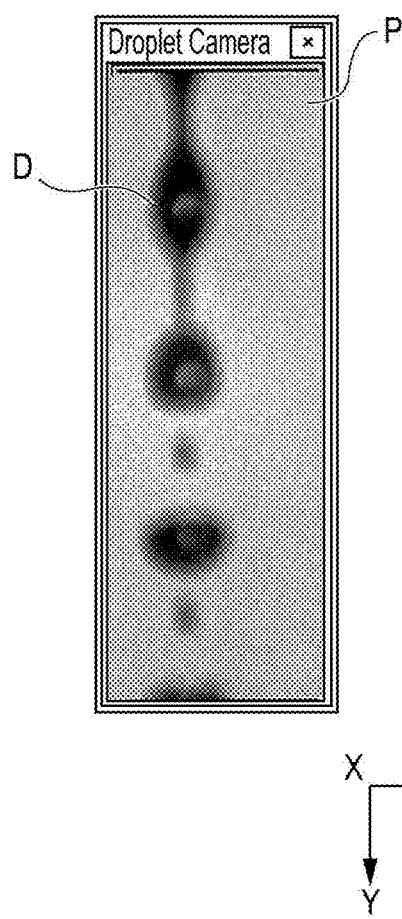
FIGS. 5A and 5B are pictures showing an example of images before and after focusing which are imaged by a droplet camera of a flow cytometer.
Figure 5B:
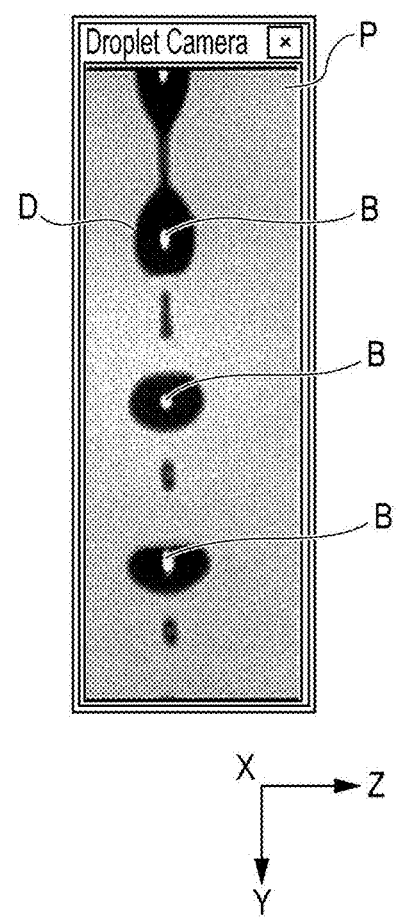
Figure 5B:
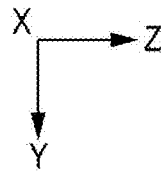
Figure 5B:
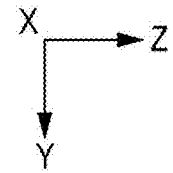

FIG. 5A represents a picture showing an example of a state before the focusing of the imaged liquid droplets is performed (see FIG. 5A), and FIG. 5B represents a picture showing an example of a state after the focusing of the liquid droplets is performed (see FIG. 5B). As shown in FIG. 5B, since the focusing of the image P is performed, it is possible to detect at least one bright point B in the center position of each liquid droplet D. Even in a case where the fluid stream S is ejected instead of the liquid droplets D from the orifice, it is possible to detect at least one bright point B in the center portion along the trajectory of the fluid stream S in the same manner. Accordingly, in the step $S_4$, the focusing of the droplet camera 4 is executed until at least one bright point B is detected in the captured image P. At that time, in a case where the contrast ratio of the image P is in a predetermined range, the control unit can determine whether the image P is in a focused state.

When the fluid stream S is imaged by the droplet camera 4, the control unit may determine the diameter of the orifice, based on the width of the fluid stream S detected in the direction perpendicular (Z axis direction) to the trajectory of the fluid stream S in the captured image P.

Figure 6A:
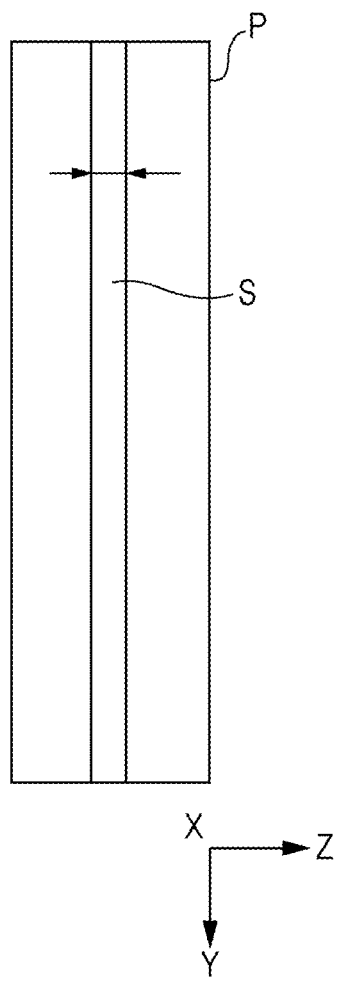
FIGS. 6A and 6B are schematic diagrams showing images of fluid streams having different widths from each other imaged by a droplet camera of a flow cytometer.
Figure 6B:
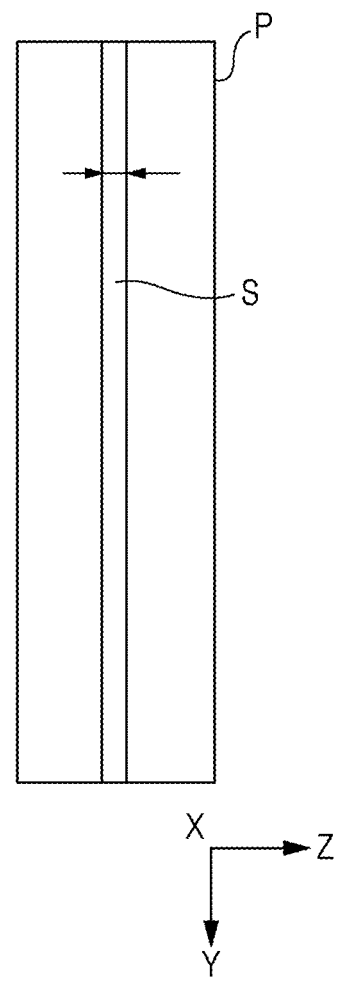

FIGS. 6A and 6B show schematic diagrams of two captured images which have a different width of the fluid stream S from each other (FIGS. 6A and 6B). The control unit may be configured to determine accurately that the diameter of the orifice is 100 μm or the like, for example, by evaluating the width of the fluid stream S shown in FIG. 6A based on information stored in a memory unit. In the example shown in FIG. 6B, which has different width of the fluid stream S from that shown in FIG. 6A, the control unit may be configured to determine accurately that the diameter of the orifice is 70 μm or the like, for example, by evaluating the width of the fluid stream S based on the information stored in the memory unit. The control unit may record or display the determined diameter of the orifice as the diameter of the orifice of the chip used in the flow cytometer 1. Accordingly, a manual setting or recording of the diameter of the orifice by a user is not necessary, and thus it is possible to prevent setting mistakes such as mis-setting or mis-recording the diameter of the orifice.

2-4. Center Line Detecting Step $S_4$

In the step $S_4$, the control unit may detect a center line of the fluid stream S from one or more bright points in the image of the fluid stream S (or the liquid droplets D) imaged by the droplet camera 4, and may compare preset center line information with the detected center line (see FIG. 4).

FIGS. 7A and 7B show states when a center line L of the fluid stream S (or the liquid droplets D) is detected in the captured image. When the fluid stream S is ejected from the orifice, the control unit may be configured to detect the straight line formed by the plurality of bright points displayed along the ejecting direction of the fluid stream S in the image of the fluid stream S imaged by the droplet camera 4 as the center line L. In detail, as shown in FIG. 7A, the control unit may identify the bright points B in the captured image P of the fluid stream S as the center line L.

When the liquid droplets D are discharged from the orifice, the control unit may be configured to detect a straight line formed by connecting one or more bright points displayed in each of the liquid droplets D as the center line L. In detail, as shown in FIG. 7B, when the liquid droplets D are imaged, the control unit may identify a line formed by connecting the bright points of each of the liquid droplets as the center line L of the liquid droplets. In this case, according to the connecting method of the bright points of each of the liquid droplets D, when a plurality of center lines L can be generated, the control unit may set a line which most closely approximates the center line information which will be described later, as the center line.

2-5. Displaying Step $S_5$

In the step $S_5$, the control unit can display the captured image on a display unit such as a display monitor (see FIG. 4).

As shown in FIGS. 7A and 7B, the control unit can arrange and display the fluid stream S (see FIG. 7A) or the liquid droplets D (see FIG. 7B) of the captured image in the center of such a display based on the center line L which is described above. In more detail, for example, first, the control unit may align the droplet camera 4 in the Z axis direction. The control unit may perform alignment based on the captured image P, until the number of the pixels of the positive direction side and the negative direction side of the Z axis direction become the same by setting the center line L as the boundary between positive side and negative side pixels.

Accordingly, in the flow cytometer 1, the image P of the fluid stream S (or the liquid droplets D) can be automatically aligned and displayed in the center of the display.

2-6. Orbital Direction Determining Step $S_6$

In the step $S_6$, the control unit may determine the trajectory of the fluid stream S (or the liquid droplets D) (see FIG. 4). In more detail, the control unit may determines a deviation of the trajectory in the Z axis direction and also a deviation of the trajectory in the X axis direction. Hereinafter, the processes of "Z axis direction determining step $S_{61}$" and "X axis direction determining step $S_{62}$" are included. Each process will be described later.

2-6-1. Z Axis Direction Determining Step $S_{61}$

In the step $S_{61}$, the control unit may determine a trajectory of the fluid stream S (or the liquid droplets D) in the Z axis direction.

As depicted in FIGS. 7A and 7B, the control unit may compare the center line L and predetermined center line information stored in the memory unit in advance. With respect to the fluid stream S (or the liquid droplets D), the center line L is detected as described above. The predetermined center line information may be information representing a straight line perpendicular to XZ plane stored in the memory unit in advance, and may further represent a line which makes the number of pixels of the positive direction side and the negative direction side of the Z axis direction the same by setting the predetermined center line as the boundary, in the captured image.

Figure 8A:
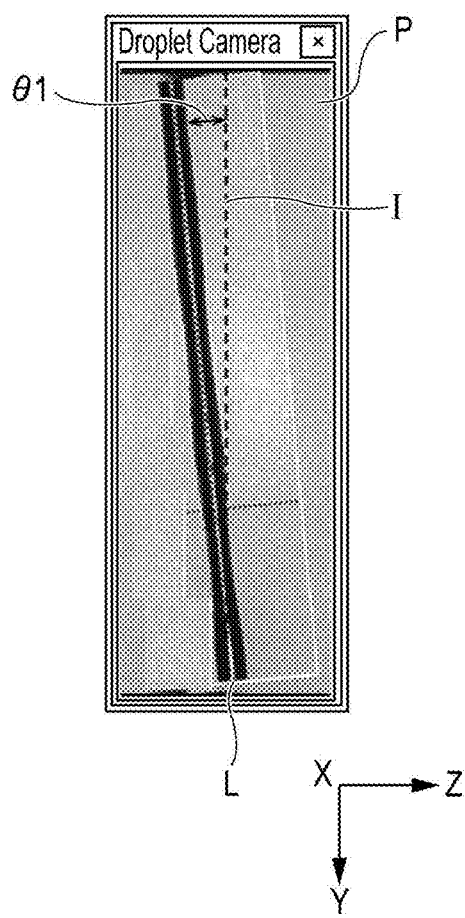
FIGS. 8A and 8B are pictures showing an example of images of a fluid stream and liquid droplets imaged by a droplet camera of a flow cytometer.
Figure 8B:
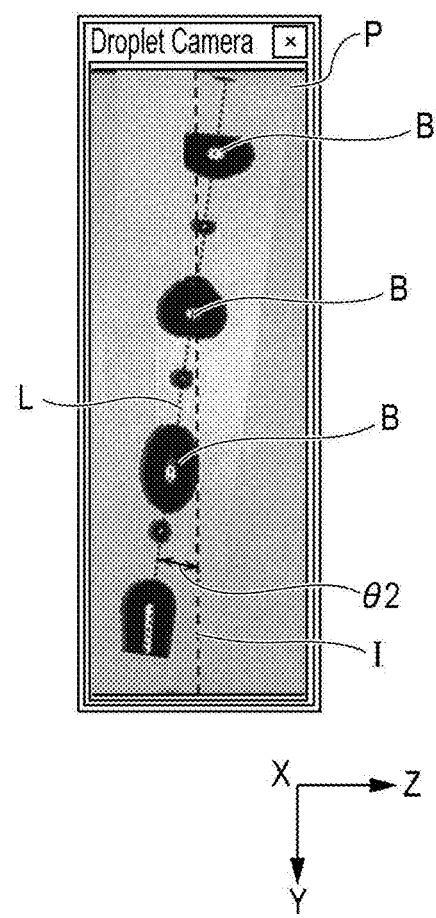

Herein, the comparison between the center line L and the predetermined center line information I stored in the memory unit in advance will be described while further referring to FIGS. 8A and 8B, in addition to FIGS. 7A and 7B. FIGS. 8A and 8B also show states where the determined center line L of the fluid stream S (or the liquid droplets D) is detected in the captured image in the same manner as FIGS. 7A and 7B.

In the example shown in FIG. 8A, the center line L is deviated by θ1 degrees in the YZ plane with respect to the predetermined center line information I (see FIG. 8A). In the same manner, in the example shown in FIG. 8B, the center line is deviated by θ2 degrees in the YZ plane when compared to the predetermine center line information I (see FIG. 8B). In the example shown in FIG. 8A, the process of the display step $S_5$, for making the number of the pixels of the positive direction side and the negative direction side of the Z axis direction the same by setting the center line L as the boundary by the control unit is omitted.

Meanwhile, in a case of the example shown in FIGS. 7A and 7B, the control unit may determine that there is nearly no deviation of the center line L in the YZ plane with respect to the predetermined center line information I (see FIGS. 7A and 7B).

The control unit may also be configured to determine that an inclination angle (e.g., the angles θ1, or θ2) with respect to the center line information I of the center line L detected based on the comparison of the center line L and the center line information I, exceeds a predetermined threshold value, and determine that the microchip is abnormal. As described above, the control unit can determine the deviation of the trajectory of the fluid stream S (or the liquid droplets D) in the Z axis direction by comparing the center line information I and the center line L, and when the trajectory is deviated, the control unit can automatically determine that the microchip or the like is in a malfunction state (abnormal state of clogging or the like). An inclination angle that may result in an abnormal determination may be an inclination angle greater than 0.5 degree in some embodiments, greater than 1 degree in some embodiments, greater than 2 degrees in some embodiments, greater than 5 degrees in some embodiments, greater than 10 degrees in some embodiments, or greater than 20 degrees in some embodiments. An abnormal inclination angle may be an angle at which the ejected stream will no longer be captured by a collection vessel.

2-6-2. X Axis Direction Determining Step $S_{62}$

In the step $S_{62}$, the control unit may determine a trajectory of the fluid stream S (or the liquid droplets D) in the X axis direction (see FIG. 4).

Figure 9A:
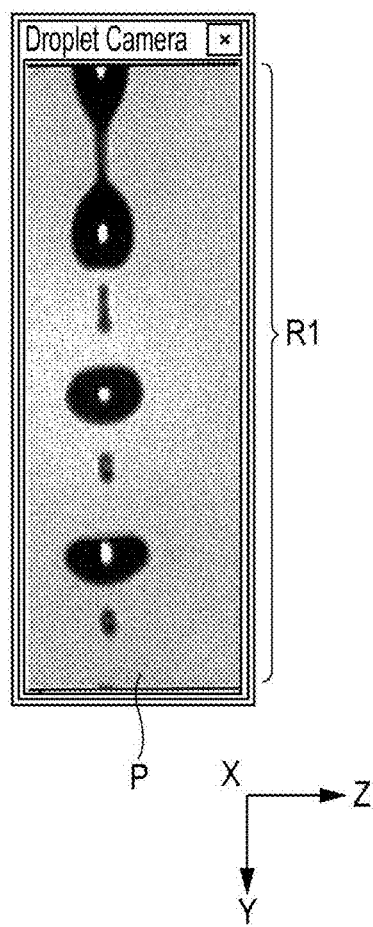
FIGS. 9A and 9B are pictures showing an example of images of liquid droplets imaged by a droplet camera of a flow cytometer.
Figure 9B:
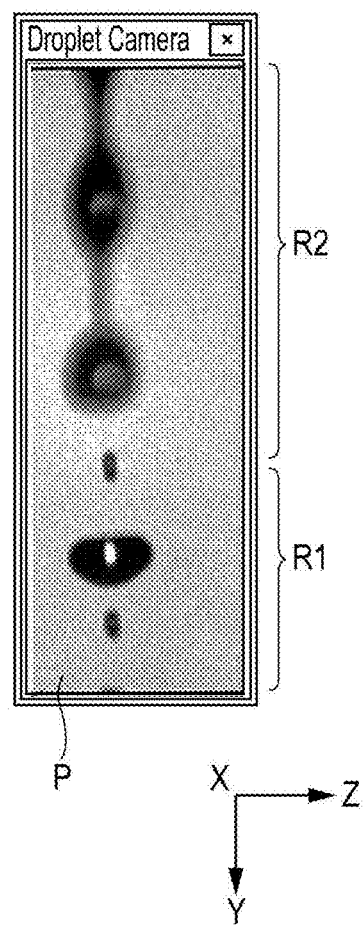

FIGS. 9A and 9B show pictures of an example of the images of the liquid droplets in which the focusing may be performed. As shown in FIG. 9A, when the trajectory of the liquid droplets D is not deviated in the X axis direction, since the focusing of the droplet camera 4 is performed based on the signals of the control unit, a focused region R1 is detected for the length of the stream in the image, while a non-focused region R2 is not detected.

Meanwhile, as shown in FIG. 9B, when the trajectory of the liquid droplets D is deviated in the X axis direction, since the focusing of the droplet camera 4 is performed based on the signals of the control unit, a focused region R1 is detected for a portion of the stream length and a non-focused region R2 is also detected.

Since the control unit detects both the non-focused region R2 and the focused region R1 in the image P, the abnormity of the microchip or the like can be determined. Accordingly, when identifying the existence of the non-focused region R2 in the image of the fluid stream S or the liquid droplets D and confirming the existence of the non-focused region R2, the control unit determines that the trajectory of the fluid stream S or the liquid droplets D is deviated in the X axis direction. Therefore, in the flow cytometer 1, when the trajectory is deviated in the X axis direction, the control unit may automatically determine that the microchip or the like is in a malfunction state (abnormity state of clogging or the like).

Figure 10A:
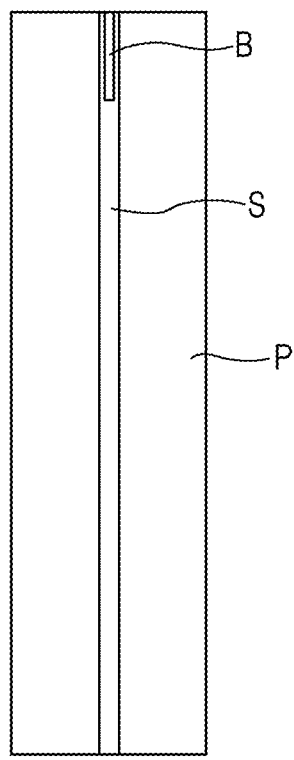
FIGS. 10A and 10B are schematic diagrams showing an example of images of fluid streams imaged by a droplet camera of a flow cytometer.
Figure 10B:
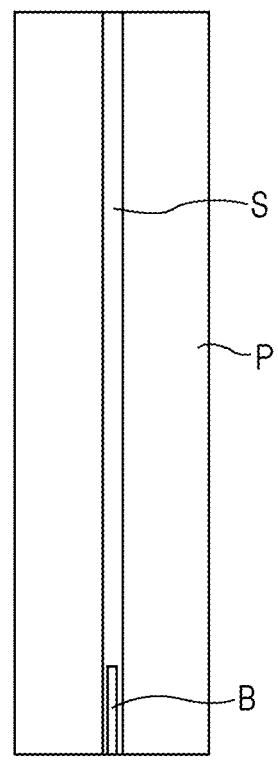

FIGS. 10A and 10B show schematic diagrams of the image of fluid stream S in which at least one bright point is detected. As shown in FIGS. 10A and 10B, for example, the control unit may perform focusing on a negative direction side of the Y axis direction, and at least one bright point B may be detected (see FIG. 10A). Further, the control unit may perform focusing on a positive direction side of the Y axis direction, and at least one bright point B may be detected at a second focus position different from a first focus position found for the at least one bright point B shown in FIG. 10A (see FIG. 10B). Accordingly, the control unit can perform the focusing on two portions of the end portions (end portion of the positive Y axis direction side and the end portion of the negative Y direction side) of the fluid stream S in the image P of the fluid stream S. Thus, the control unit can obtain position information corresponding to the deviation of the trajectory in the X axis direction, and in the collection tube moving and aligning step $S_8$ which will be described later, the aligning of the collection tubes 3 in the X axis direction can be performed by using the detected position information.

2-7. Alerting Step $S_7$

In the step $S_7$, after evaluating stream or droplet trajectories in the Z axis direction and/or the X axis direction, the control unit may determine that the inclination or deviation angle exceeds a predetermined threshold value. In response, the control unit may perform alerting with respect to a user (see FIG. 4). In this case, various methods such as, a method for displaying a light or a message by a display unit such as a display, or a method for providing an output unit in the flow cytometer 1 and alerting by an audio output or the like, can be used as a method for alerting a user. Thus, the user can check for the, malfunction, breakage, or the like of the chip.

2-8. Collection Tube Moving and Aligning Step $S_8$

In the collection tube moving and aligning step $S_8$, the control unit may perform positioning of the collection tubes 3 based on the position information corresponding to the deviation of the trajectory in the X axis direction described above (see FIG. 4). In detail, the information regarding the trajectory of the fluid stream S (or the liquid droplets D) in the X axis direction is converted into the position information of the collection tubes 3 in the same direction, and the collection tubes 3 are moved to the position corresponding to the converted position information. Accordingly, the collection tubes 3 disposed in the collection tube container 31 and the fluid stream S are aligned in the X axis direction, and it is possible for the ejected fluid stream S to reach the collection tubes 3 precisely.

In addition, in the collection tube moving and aligning step $S_8$, the control unit may perform positioning of the collection tube container 31 based on the position information obtained by the aligning of the Z axis direction described above. In detail, the information regarding the trajectory of the fluid stream S (or the liquid droplets D) in the Z axis direction is converted into the position information of the collection tubes 3 in the same direction, and the Z axis stage 32 is moved to the position corresponding to the converted position information. Thus, the collection tubes 3 disposed in the collection tube container 31 and the fluid stream S are aligned in the Z axis direction, and it is possible for the ejected fluid stream S to reach the collection tubes 3 precisely. In the above descriptions, each process of the steps $S_1$ to $S_8$ has been described in order, however, the present technology is not limited to be executed in this order. For example, the process of step $S_7$ may be executed after the process of the step $S_8$. In some embodiments, not all steps may be implemented. In some embodiments, one or more steps may be repeated.

3. Various Additional Embodiments

Additional embodiments of apparatus and related methods are also contemplated. In some embodiments, a micro-particle sorting apparatus comprises an imaging device that images a fluid stream ejected from an orifice, or liquid droplets discharged from the orifice, and a control unit. The control unit may be configured to detects a center line of the fluid stream or the plurality of the liquid droplets from contrasted points in an image of the fluid stream or the liquid droplets imaged by the imaging device, and compare the center line with preset center line information. The micro-particle sorting apparatus may further include a display unit that displays the image. According to some embodiments, the imaging device may be configured to focus the captured image, and the control unit may performs focusing on at least a part of regions of the image. The control unit may be configured to determine, based upon a contrast ratio of selected portion of the image falling in a predetermined range, that the image is in a focused state or a non-focused state. According to some embodiments, the micro-particle sorting apparatus may comprise a microchip flow cytometer in which the orifice is provided in a microchip.

In some embodiments, the control unit may be configured to identify or set a straight line corresponding to a plurality of the contrasted points of the fluid stream displayed along the ejection direction in the image of the fluid stream imaged by the imaging device. The straight line may be identified as the center line and trajectory of the ejected fluid stream from the orifice. In some embodiments, the control unit may be configured to identify or set the straight line corresponding to a plurality of the contrasted points of the liquid droplets displayed along the ejection direction discharged from the orifice in the image of the fluid stream imaged by the imaging device, and to identify the straight line as a center line and trajectory of the ejected droplets. The control unit may be configured to determine an abnormality of the ejected fluid stream or liquid droplets by calculating an inclination value between the identified center line and a predetermined reference line. The abnormality may be determined when a comparison between the center line and the reference line exceeds a predetermined threshold value.

In some embodiments of the micro-particle sorting apparatus, the control unit may be configured to determine an existence of a non-focused region in the image of the fluid stream or the plurality of the liquid droplets. The control unit may determine an abnormality in the image when the non-focused region and a focused region are detected in the image of the fluid stream or the plurality of the liquid droplets.

According to some embodiments, the micro-particle sorting apparatus may comprise a pair of deflection plates that are disposed to oppose each other with the fluid stream or the liquid droplets imaged by the imaging device interposed therebetween. The micro-particle sorting apparatus may further comprise at least one collection container configured to collect the fluid stream and capable of moving at least in a direction parallel to the imaging direction of the imaging device. The control unit may be configured to adjust the position of the collection container based on information regarding a deviation of the orbital direction of the fluid stream obtained by focusing on at least two parts in the image of the fluid stream. The focusing of the two parts may comprise a focusing of two end portions of the fluid stream in the image of the fluid stream.

In some embodiments, the control unit may be configured to determine the diameter of the orifice based on the width of the fluid stream detected in the perpendicular direction to the trajectory direction of the fluid stream of the image imaged by the imaging device.

The foregoing embodiments and features of a micro-particle sorting apparatus may be implemented in any combination.

Embodiments also include a method of determining a trajectory of a fluid stream or liquid droplets of a micro-particle sorting apparatus. The method may comprise, in order, acts of obtaining an image of an ejected fluid stream or liquid droplets, detecting a center line from contrasted points within the image, comparing the center line with preset reference line information, and displaying the image. The contrasted points may be located centrally within the ejected fluid stream or liquid droplets.

As described above, in the flow cytometer 1, the trajectory of the fluid stream S (or the liquid droplets) can be automatically determined. Thus, in the flow cytometer 1, highly precise analysis can be simply performed.

The present technology contains subject matter related to that disclosed in Japanese Priority Patent Application JP 2012-080366 filed in the Japan Patent Office on Mar. 30, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A flow cytometer comprising:
   a micro-orifice configured to eject a fluidic stream;
   an imaging device configured to image an ejected stream, the ejected stream being at least a portion of the fluidic stream ejected from the micro-orifice and comprising a continuous liquid stream or a stream of separated liquid droplets, wherein the imaging device includes a focusing apparatus; and
   at least one processor configured to receive and process an image of the ejected stream imaged by the imaging device, to detect one or more contrasted spots located centrally within the ejected stream, and to evaluate, based on the image of the ejected stream imaged by the imaging device, a trajectory of the ejected stream in first and second axis directions orthogonal to a direction in which the ejected stream is ejected from the micro-orifice, based on the one or more contrasted spots detected in the received image, wherein the at least one processor is further configured to determine a first brightness level within at least one central region of the liquid stream or liquid droplets and a second brightness level in at least one remaining region of the liquid stream or liquid droplets and to control the focusing apparatus based on the determined first and second brightness levels so as to change a focus of the received image.

2. The flow cytometer of claim 1, further comprising:
   electrostatic deflection apparatus configured to deflect the liquid droplets; and
   charging apparatus configured to apply charges to individual liquid droplets so that individual liquid droplets carrying micro-particles may be sorted according to pre-selected sorting criteria.

3. The flow cytometer of claim 1, wherein the focus of the received image is changed according to a contrast ratio computed from the first and second brightness levels.

4. The flow cytometer of claim 1, wherein the at least one processor is configured to evaluate the trajectory of the ejected stream based upon an arrangement of one or more bright spots detected within the image of the ejected stream.

5. The flow cytometer of claim 4, wherein the at least one processor is configured to evaluate the trajectory by identifying a line that connects the one or more bright spots.

6. The flow cytometer of claim 1, wherein the at least one processor is further configured to compute an angle associated with the trajectory of the ejected stream.

7. The flow cytometer of claim 6, wherein the computed angle is a measure of deviation of the ejected stream from a predetermined direction.

8. The flow cytometer of claim 6, wherein the at least one processor is further configured to detect an abnormality in operation of the flow cytometer if the computed angle is greater than a predetermined threshold value.

9. The flow cytometer of claim 8, wherein the detected abnormality is associated with a micro-fluidic chip having the micro-orifice.

10. The flow cytometer of claim 8, wherein the at least one processor is further configured to execute an alerting function if the computed angle is greater than a predetermined threshold value.

11. The flow cytometer of claim 1, further comprising movable sample collection tubes that are configured to be moved in an automated manner responsive to the at least one processor determining that the trajectory of the ejected stream deviates from a predetermined trajectory.

12. The flow cytometer of claim 1, wherein the at least one processor is configured to calculate the trajectory of the ejected stream in a focus direction based upon a first focus condition of a first portion of the ejected stream and a second focus condition of a second portion of the ejected stream.

13. The flow cytometer of claim 12, wherein the first focus condition is evaluated by focusing a first bright spot centrally in the ejected stream near a first end of the ejected stream and the second focus condition is evaluated by focusing a second bright spot centrally in the ejected stream near a second end of the ejected stream.

14. The flow cytometer of claim 12, wherein the at least one processor is configured to calculate the trajectory of the ejected stream based upon a difference in positions associated with the first focus condition and second focus condition.

15. The flow cytometer of claim 1, wherein the at least one processor is further configured to identify a width of the ejected stream in the received image and determine a diameter of the micro-orifice based upon the identified width of the ejected stream.

16. The flow cytometer of claim 1, wherein the micro-orifice is an exit orifice of a micro-fluidic chip.

17. The flow cytometer of claim 1, wherein the processor is further configured to determine a deviation of the trajectory of the ejected stream, in the first and second axis directions, from a predetermined trajectory and to generate first and second position signals based on the determined deviation.

18. A trajectory evaluation system for an ejected stream of a flow cytometer, the trajectory evaluation system comprising:
    an imaging device configured to image the ejected stream, wherein the ejected stream is at least a portion of a fluidic stream ejected from a micro-orifice of the flow cytometer, wherein the ejected stream comprises a continuous liquid stream or a stream of separated liquid droplets and wherein the imaging device includes a focusing apparatus; and
    at least one processor configured to receive and process an image of the ejected stream imaged by the imaging device, to detect one or more contrasted spots located centrally within the ejected stream, and to evaluate, based on the image of the ejected stream imaged by the imaging device, a trajectory of the ejected stream in first and second axis directions orthogonal to a direction in which the ejected stream is ejected from the micro-orifice, based on the one or more contrasted spots detected in the received image, wherein the at least one processor is further configured to determine a first brightness level within at least one central region of the liquid stream or liquid droplets and a second brightness level in at least one remaining region of the liquid stream or liquid droplets and to control the focusing apparatus based on the determined first and second brightness levels so as to change a focus of the received image.

19. The trajectory evaluation system of claim 18, wherein the processor is further configured to determine a deviation of the trajectory of the ejected stream, in the first and second axis directions, from a predetermined trajectory and to generate first and second position signals based on the determined deviation.

20. A method of measuring a trajectory of an ejected stream in a flow cytometer, the method comprising:
- imaging, with an imaging device, the ejected stream, wherein the ejected stream is at least a portion of a fluidic stream ejected from a micro-orifice of the flow cytometer, wherein the ejected stream comprises a continuous liquid stream or a stream of separated liquid droplets and wherein the imaging device includes a focusing apparatus;
- receiving, by at least one processor, an image of the ejected stream imaged by the imaging device; and
- processing, by the at least one processor, the received image to detect one or more contrasted spots located centrally within the ejected stream and to evaluate, based on the image of the ejected stream imaged by the imaging device, a trajectory of the ejected stream in first and second axis directions orthogonal to a direction in which the ejected stream is ejected from the micro-orifice, based on the one or more contrasted spots detected in the received image, wherein processing further includes determining a first brightness level within at least one central region of the liquid stream or liquid droplets and a second brightness level in at least one remaining region of the liquid stream or liquid droplets and controlling the focusing apparatus based on the determined first and second brightness levels so as to change a focus of the received image.

* * * * *